United States Patent
Takahashi et al.

[11] 3,870,402
[45] Mar. 11, 1975

[54] WIDE, ANGLE, HIGH APERTURE RATIO, LONG BACK FOCUS LENS SYSTEM

[75] Inventors: Yasuo Takahashi, Tokyo; Sadao Okudaira, Saitama-ken, both of Japan

[73] Assignee: Asahi Kogaku Kogyo Kabushiki Kaisha, Tokyo, Japan

[22] Filed: July 17, 1973

[21] Appl. No.: 380,050

[30] Foreign Application Priority Data
July 25, 1972   Japan................................ 47-74426

[52] U.S. Cl.................................. 350/214, 350/176
[51] Int. Cl........................... G02b 1/00, G02b 9/00
[58] Field of Search............................ 350/214, 176

[56] References Cited
UNITED STATES PATENTS
3,622,227   11/1971   Shimizu .............................. 350/214
FOREIGN PATENTS OR APPLICATIONS
4,539,875   12/1970   Japan................................. 350/214

Primary Examiner—Paul A. Sacher
Attorney, Agent, or Firm—Wolder & Gross

[57] ABSTRACT

A wide angle objective lens system of high aperture ratio and long back focus includes eight successively designated lens elements in which the sixth and seventh lens elements are cemented at their confronting surfaces to form a doublet and which satisfies the following conditions:

$F/0.5 < |F_1| < F/0.3, F_1 < 0$
$F/0.92 < |F_{1.2.3}| < F/0.65, F_{1.2.3} < 0$
$F/0.45 < |F_{1.2.3.4.5}| < F/0.15, F_{1.2.3.4.5} < 0$
$0.9F < r_{10} < 1.4F$
$1.75 < (n_7 + n_8)/2$ wherein F is the focal length of the lens system, $F_{1.2....i}$ is the focal length of the group of the first to the $i$th lens, $n_i$ is the refractive index of the $i$th lens and $r_{10}$ is the radius of curvature of the rear face of the fifth lens.

3 Claims, 6 Drawing Figures

WIDE, ANGLE, HIGH APERTURE RATIO, LONG BACK FOCUS LENS SYSTEM

BACKGROUND OF THE INVENTION

The present invention relates generally to improvements in lens systems and it relates more particularly to an improved wide angle, high aperture ratio long back focus lens system useful as a camera objective lens.

There has been a strong trend toward the use of wide angle high aperture ratio lens systems as photographic objectives, specifically those of the retro-type with long back focal lengths. However, these lens systems are generally characterized by their large front frames and great bulk and often by poor optical properties. Many lens systems have been proposed which specify front frames of reduced dimensions, but these possess numerous drawbacks. The front frames thereof, particularly in very wide angle high aperture ratio lenses are still large and bulky, and the optical properties of the lens system still leave much to be desired. These large front frames greatly interfere with the proper and convenient operation and handling of the camera employing such a lens system.

SUMMARY OF THE INVENTION

It is a principal object of the present invention to provide an improved lens system.

Another object of the present invention is to provide an improved camera wide angle high aperture ratio objective lens system of long back focal length.

Still another object of the present invention is to provide an improved compact camera objective lens of an aperture ratio of about 1:2, a filled angle of about 75° and a long back focus with a very small front frame.

A further object of the present invention is to provide an objective lens system of the above nature characterized by its low aberration and distortion characteristics and other superior optical properties and its great versatility and adaptability.

The above and other objects of the present invention will become apparent from a reading of the following description taken in conjunction with the accompanying drawings which illustrate preferred embodiments thereof.

In a sense, the present invention contemplates the provision of a wide angle, high aperture ratio long back focus lens comprising eight successively designated lens elements in which the sixth and seventh lenses are cemented at their confronting faces to form a doublet, the lens system satisfying the following enumerated conditions (1) to (5):

1. $F/0.5 < |F_1| < F/0.3$, $F_1 < 0$
2. $F/0.92 < |F_{1,2,3}| < F/0.65$, $F_{1,2,3} < 0$
3. $F/0.45 < |F_{1,2,3,4,5}| < F/0.15$, $F_{1,2,3,4,5} < 0$
4. $0.9F < r_{10} < 1.4F$
5. $1.75 < (n_7 + n_8)/2$ wherein F is the focal length of the full lens system, $F_{1,2,...,i}$ is the focal length of the group consisting of the first to the $i$th lens, $r_{10}$ is the radius of curvature of the rear face of the fifth lens and $n_i$ is the index of refraction of the $i$th lens element. Advantageously the first, third, fifth and sixth lens elements are negative and the second, fourth, seventh and eighth lenses are positive and advantageously $F_1/F$ is between −2.40 and −3.07, $F_{1,2,3}/F$ is between −2.58 and −3.60.

In the preferred form of the improved lens system the first lens element is a negative meniscus lens with a convex front face, the second lens element is a positive lens and the third lens element is a negative meniscus lens with a convex front face, the first, second and third lens elements defining a front lens group. The fourth lens element is positive and the fifth lens element is a negative meniscus lens and defines with the fourth lens element an intermediate lens group. The sixth lens element is a negative lens and the seventh lens element is a positive lens, the sixth and seventh lenses being cemented at their confronting mating faces to form a doublet. The eighth lens element is positive and defines with the seventh and eighth lens elements a rear lens group.

The above conditions (1) and (2) are required to achieve a wide-angle lens with a half photographing field angle of approximately between 37° and 38°. In the lens of a relatively high aperture ratio an excessive angle would increase the aberrations. Furthermore the parameters of the second lens member are chosen to effect the compensation of distortion and chromatic aberration under the conditions (1) and (2).

When $|F_1|$ is shorter than $F/0.5$, the condition (1) serves to reduce the system dimensions and to prolong the back focus but results in a combination of an excessive angle as mentioned above which would increase aberrations, especially, the chromatic aberration of magnification and the coma aberration. When $|F_1|$ is longer than $F/0.3$, on the contrary, it is obvious that the condition (1) would be advantageous in connection with aberrations but disadvantageous for the reduction of the lens system dimensions.

The condition (2) determines, in correlation with the condition (1) the distribution of angle among the negative lens members included in the front group and also determines the back focus in a close correlation with the subsequent spacing. When $|F_{1,2,3}|$ is shorter than $F/0.92$, the spherical aberration would increase in a negative direction and the residual of the chromatic aberration would also increase so that the subsequent spacing should be reduced and increasing the back focus would be less meaningful. When $|F_{1,2,3}|$ is excessively longer than $F/0.65$, there would arise a problem as to whether the amount of light should be increased by enlarging the front group or the rear group, since, in this case, the subsequent spacing should be sufficiently enlarged and compensation of aberrations by the following condition (4) would also be seriously influenced by this condition (2).

The condition (3) determines the distribution of angle between the positive lens member principally adapted for the compensation of the aberrations such as the spherical and chromatic aberrations and the negative lens member arranged therebehind governing the condition (4) in the intermediate group relative to the front group determined by the conditions (1) and (2). When $|F_{1,2,...,5}|$ is shorter than $F/0.45$, therefore, condition (3) would be advantageous for the prolongation of the back focus but would possibly overload the positive lens members in the rear group so that it would be desired to make the back focus long within a range of the desired values (i.e., negatively long or closer to positive). When $|F_{1,2,...,5}|$ is longer than $F/0.15$, it would be difficult to make the back focus within the range of the desired values and the fifth lens member would be unable to function as a negative lens member with difficulties occurring in the compensation not only of the chromatic aberration, but also of the other aberrations.

The condition (4) functions principally to compensate the coma aberration in a suitable manner. When $r_{10}$ is shorter than 0.9F, there would occur disturbance of the image in the direction along which the image height increases with respect to light rays of a relatively low height of incidence. This would be related also to the other factors such as the refractive index and the lens thickness. When $r_{10}$ is longer than 1.4F, on the other hand, said light rays would bring about disturbance of the image in the direction along which the image height decreases. If it is intended to compensate such a disturbance at the tenth lens face or later, there would possibly occur difficulties in compensation of the intermediate angle and, when it is excessively intended, also in compensation of the spherical aberration.

The condition (5) functions to maintain the spherical aberration moderate. In the lenses such as that arranged according to the present invention which have long back focuses, generally, the condition (5) is essential to keep the spherical aberration suitable for the lens of higher aperture ratio since a positive angle in the rear group necessarily increases. Also, the fact that glas material of a small $v$ value must be employed for the sixth lens member for compensation of the chromatic aberration in the rear group maintaining a negative angle considerably high necessarily increases the positive angle and necessitates a relatively high refractive index.

The improved objective lens system is wide angled, of high aperture ratio and long back focus, possesses a high optical performance and is very compact and with a very small front frame.

DESCRIPTION OF THE PREFERRED EMBODIMENTS

Figure 1:
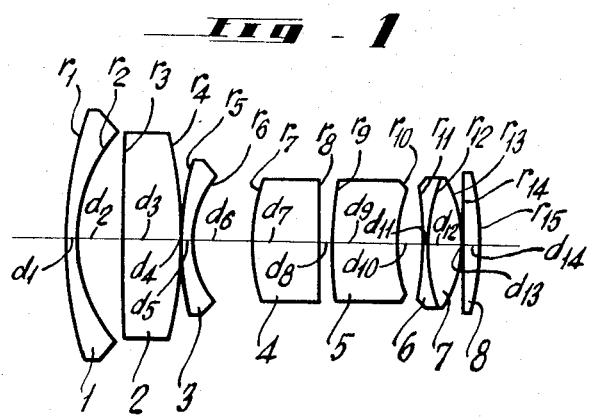
FIG. 1 is a side elevational view of a lens system embodying the present invention.

Referring now to the drawings which illustrate preferred embodiments of the present invention and in which the same references in each embodiment designate corresponding components and dimensional relationships, the lens system of each of the embodiments includes eight lens elements successively designated 1 to 8 from the front lens directed toward the object to the eighth lens directed toward the image. The sixth lens 6 and the seventh lens 7 have cemented mating confronting faces to form a doublet.

The first three lenses define a front group and the first lens 1 is a negative meniscus lens with a refractive index $n_1$, an Abbe number $v$ , a convex front face of a radius of curvature $r_1$ a concave rear face of radius of curvature $r_2$ and a thickness of $d_1$, the second lens 2 is a positive lens with a refractive index $n_2$, an Abbe number $v_2$, a front face of radius of curvature $r_3$ spaced from the rear face of lens 1 a distance $d_2$, a rear convex face of radius of curvature $r_4$ and a thickness $d_3$, and the third lens 3 is a negative meniscus lens with a refractive index $n_3$, an Abbe number $v_3$, a convex front face of radius of curvature $r_5$ spaced from the rear face of lens 2 a distance $d_4$, a concave rear face of radius of curvature $r_6$ and a thickness $d_5$.

The fourth and fifth lenses define an intermediate group, and the fourth lens is a positive lens with a refractive index $n_4$, an Abbe number $v_4$, a convex front face spaced a distance $d_6$ from the rear face of lens 3 and a radius of curvature $r_7$, a rear face of radius of curvature $r_8$, and a thickness $d_7$, and the fifth lens is a negative lens with a refractive index $n_5$, and Abbe number $v_5$, a front face spaced a distance $d_8$ from the rear face of lens 4 and of radius of curvature $r_9$, a concave rear face of radius of curvature $r_{10}$, and a thickness $d_9$.

The rear three lenses 6, 7 and 8 define a rear group, and the sixth lens 6 is a negative lens with a refractive index $n_6$, an Abbe number $v_6$, a concave front face spaced a distance $d_{10}$ from the rear face of lens 5 and having a radius of curvature $r_{11}$, a concave rear face of radius of curvature $r_{12}$, and a thickness $d_{11}$, the seventh lens 7 is a positive lens forming a doublet with lens 6 and having a front face mating and cemented to the rear face of lens 6, a rear convex face of radius of curvature $r_{13}$, a thickness $d_{12}$, a refractive index $n_7$ and an Abbe number $v_7$ and the eighth lens 8 is a positive lens with a refractive index $n_8$ an Abbe number $v_8$, a front face having a radius of curvature $r_{14}$ and spaced from the rear face of lens 7 a distance $d_{13}$, a rear face of radius of curvature $r_{15}$ and a thickness $d_{14}$.

In accordance with the first embodiment $n_i$, $v_i$, $r_j$ and $d_k$ as identified above have the values set forth in the following Table I.

TABLE I

| | | | | | |
|---|---|---|---|---|---|
| $r_1$ | 231.5 | $d_1$ | 8.0 | $n_1/v_1$ | 1.64000/60.2 |
| $r_2$ | 95.8 | $d_2$ | 26.9 | | |
| $r_3$ | 974.8 | $d_3$ | 34.5 | $n_2/v_2$ | 1.80610/40.8 |
| $r_4$ | −330.0 | $d_4$ | 0.4 | | |
| $r_5$ | 202.8 | $d_5$ | 8.5 | $n_3/v_3$ | 1.62041/60.3 |
| $r_6$ | 60.2 | $d_6$ | 36.4 | | |
| $r_7$ | 118.9 | $d_7$ | 41.7 | $n_4/v_4$ | 1.81554/44.5 |
| $r_8$ | 7148.9 | $d_8$ | 8.8 | | |
| $r_9$ | 270.2 | $d_9$ | 38.1 | $n_5/v_5$ | 1.80518/25.4 |
| $r_{10}$ | 109.6 | $d_{10}$ | 15.5 | | |
| $r_{11}$ | −382.9 | $d_{11}$ | 4.2 | $n_6/v_6$ | 1.80518/25.4 |
| $r_{12}$ | 122.3 | $d_{12}$ | 19.1 | $n_7/v_7$ | 1.80300/46.7 |
| $r_{13}$ | −103.9 | $d_{13}$ | 0.4 | | |
| $r_{14}$ | 888.1 | $d_{14}$ | 10.3 | $n_8/v_8$ | 1.80300/46.7 |
| $r_{15}$ | −249.0 | | | | |

Figure 2:
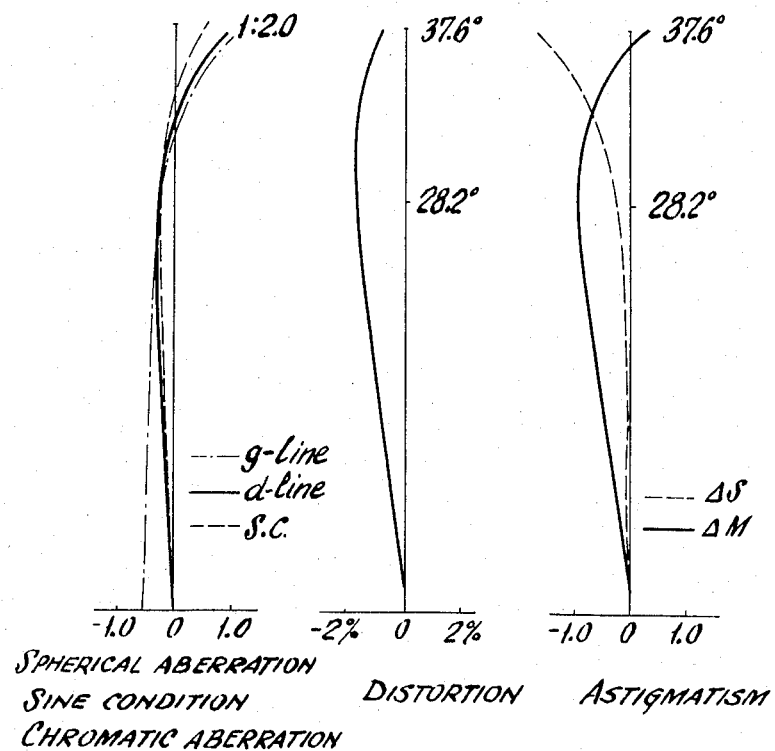
FIG. 2 is a set of curves illustrating the aberration, characteristic curves of the embodiment shown in FIG. 1.

In the above example $F_1 = -261$, $F_{1,2,3} = -121$ and $F_{1,2,3,4,5} = -264$. It should be of course noted that the values given for $r_j$ and $d_k$ are relative values and may accordingly be proportionately modified and that the relative value of F = 100. The characteristic curves of the embodiment set forth in FIG. 1 and shown in FIG. 2 demonstrate the high optical performance of the lens system.

Figure 3:
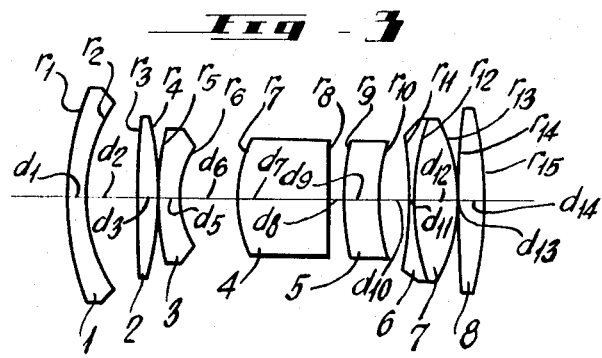
FIG. 3 is a view similar to FIG. 1 of another embodiment of the present invention.
Figure 4:
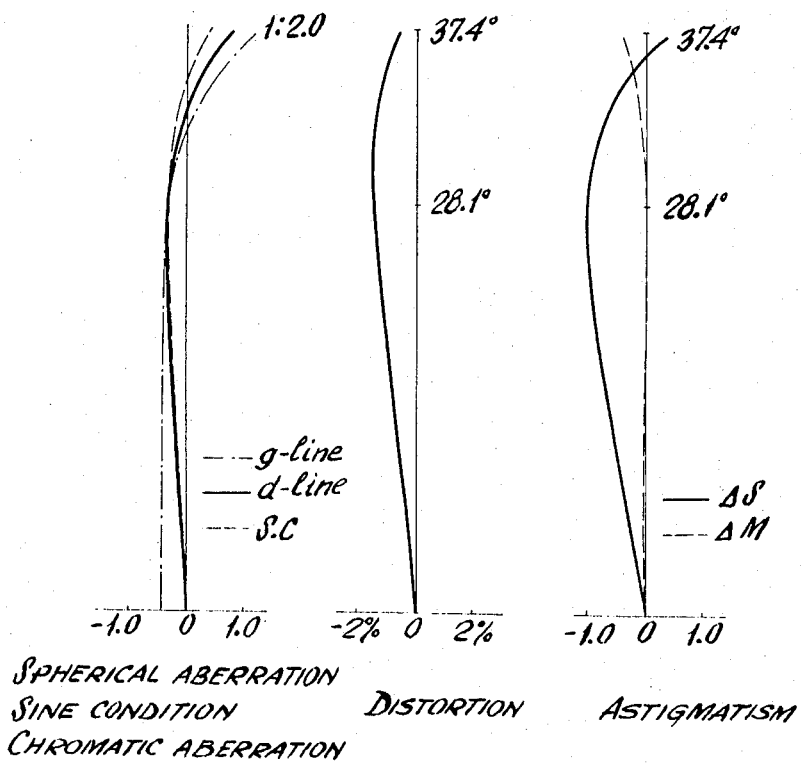
FIG. 4 is a set of curves illustrating the aberration characteristic curves of the embodiment shown in FIG. 3.

In FIGS. 3 and 4 there are illustrated another embodiment of the present invention and the characteristic curves thereof, the following Table II setting forth the specific values of the parameters thereof:

TABLE II

| | | | | | |
|---|---|---|---|---|---|
| $r_1$ | 228.1 | $d_1$ | 6.9 | $n_1/\nu_1$ | 1.65160/58.6 |
| $r_2$ | 91.5 | $d_2$ | 34.7 | | |
| $r_3$ | 771.9 | $d_3$ | 9.6 | $n_2/\nu_2$ | 1.80740/35.4 |
| $r_4$ | −334.4 | $d_4$ | 0.4 | | |
| $r_5$ | 211.7 | $d_5$ | 14.0 | $n_3/\nu_3$ | 1.54771/62.9 |
| $r_6$ | 60.9 | $d_6$ | 37.6 | | |
| $r_7$ | 123.5 | $d_7$ | 54.8 | $n_4/\nu_4$ | 1.78800/47.5 |
| $r_8$ | −3915.5 | $d_8$ | 8.8 | | |
| $r_9$ | 252.6 | $d_9$ | 22.6 | $n_5/\nu_5$ | 1.80518/25.4 |
| $r_{10}$ | 113.9 | $d_{10}$ | 15.7 | | |
| $r_{11}$ | −357.9 | $d_{11}$ | 4.2 | $n_6/\nu_6$ | 1.80518/25.4 |
| $r_{12}$ | 145.6 | $d_{12}$ | 26.2 | $n_7/\nu_7$ | 1.74100/52.7 |
| $r_{13}$ | −101.2 | $d_{13}$ | 0.4 | | |
| $r_{14}$ | 543.8 | $d_{14}$ | 14.5 | $n_8/\nu_8$ | 1.81554/44.5 |
| $r_{15}$ | −288.3 | | | | |

In the last embodiment $F = 100$, $F_1 = -240$, $F_{1,2,3} = -136$ and $F_{1,2,3,4,5} = -360$, and the high optical performance thereof is demonstrated by the characteristic curves of FIG. 4.

Figure 5:
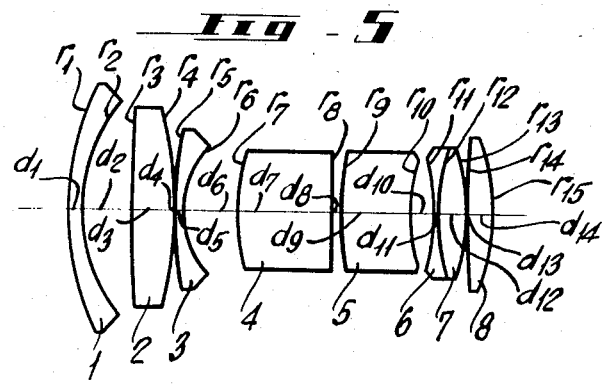
FIG. 5 is a view similar to FIG. 1 of still another embodiment of the present invention.

Another embodiment of the present invention is shown in FIG. 5 and the specific dimensions and relationships are set forth in the following Table III:

| | | | | | |
|---|---|---|---|---|---|
| $r_1$ | 199.7 | $d_1$ | 6.8 | $n_1/\nu_1$ | 1.64000/60.2 |
| $r_2$ | 97.7 | $d_2$ | 31.9 | | |
| $r_3$ | 1186.8 | $d_3$ | 25.4 | $n_2/\nu_2$ | 1.80610/40.8 |
| $r_4$ | −355.7 | $d_4$ | 1.7 | | |
| $r_5$ | 266.1 | $d_5$ | 6.7 | $n_3/\nu_3$ | 1.62041/60.3 |
| $r_6$ | 62.3 | $d_6$ | 32.6 | | |
| $r_7$ | 127.7 | $d_7$ | 57.5 | $n_4/\nu_4$ | 1.81600/46.8 |
| $r_8$ | 1211.7 | $d_8$ | 7.9 | | |
| $r_9$ | 217.6 | $d_9$ | 43.2 | $n_5/\nu_5$ | 1.80518/25.4 |
| $r_{10}$ | 120.4 | $d_{10}$ | 11.7 | | |
| $r_{11}$ | −216.1 | $d_{11}$ | 3.9 | $n_6/\nu_6$ | 1.80518/25.4 |
| $r_{12}$ | 131.2 | $d_{12}$ | 18.8 | $n_7/\nu_7$ | 1.80300/46.7 |
| $r_{13}$ | −112.5 | $d_{13}$ | 0.7 | | |
| $r_{14}$ | 694.1 | $d_{14}$ | 14.3 | $n_8/\nu_8$ | 1.81600/46.8 |
| $r_{15}$ | −164.7 | | | | |

Figure 6:
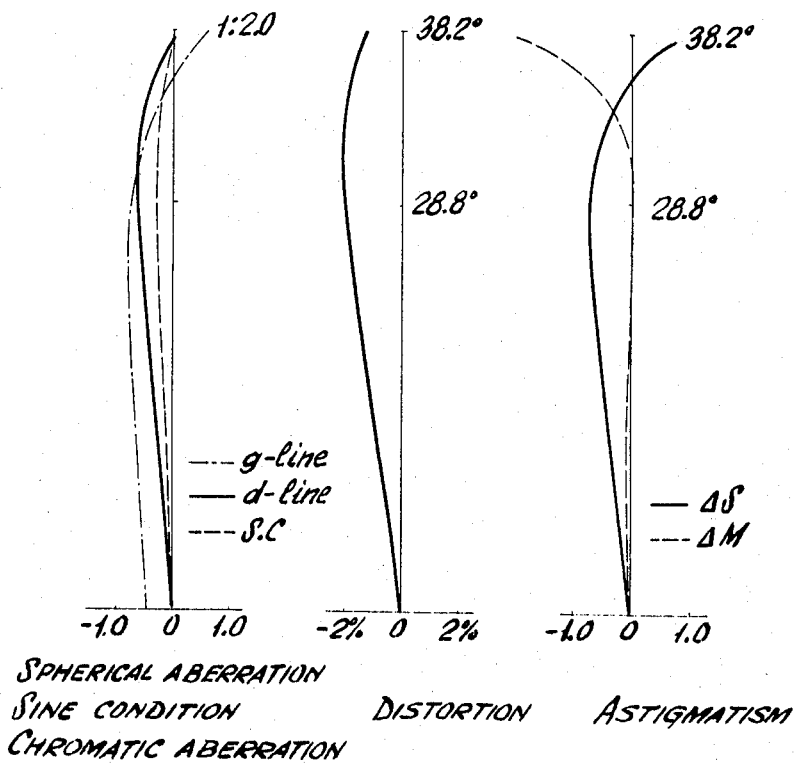
FIG. 6 is a set of curves illustrating the aberration characteristic curves of the embodiment shown in FIG. 5.

In the embodiment illustrated in FIG. 5 and specified in Table III, $F = 100$, $F_1 = -307$, $F_{1,2,3} = -118$ and $F_{1,2,3,4,5} = -258$. The characteristic curves illustrated in FIG. 6 demonstrate the high optical performance of the lens system of the last embodiment.

While there have been described and illustrated preferred embodiments of the present invention, it is apparent that numerous alterations, omissions and additions may be made without departing from the spirit thereof.

We claim:

1. A wide angle, high aperture ratio, long back focus lens system comprising eight successively designated lens elements in which the sixth and seventh lens elements are joined at their confronting faces to form a doublet, the lens system having the following dimensions and relationships, the lens faces being successively designated from the first to the fifteenth faces with the confronting faces of the sixth and seventh lenses defining a singly designated lens face:

| | | | | | |
|---|---|---|---|---|---|
| $r_1$ | 231.5 | $d_1$ | 8.0 | $n_1/\nu_1$ | |
| $r_2$ | 95.8 | $d_2$ | 26.9 | | |
| $r_3$ | 974.8 | $d_3$ | 34.5 | $n_2/\nu_2$ | 1.80610/40.8 |
| $r_4$ | −330.0 | $d_4$ | 0.4 | | |
| $r_5$ | 202.8 | $d_5$ | 8.5 | $n_3/\nu_3$ | 1.62041/60.3 |
| $r_6$ | 60.2 | $d_6$ | 36.4 | | |
| $r_7$ | 118.9 | $d_7$ | 41.7 | $n_4/\nu_4$ | 1.81554/44.5 |
| $r_8$ | 7148.9 | $d_8$ | 8.8 | | |
| $r_9$ | 270.2 | $d_9$ | 38.1 | $n_5/\nu_5$ | 1.80518/25.4 |
| $r_{10}$ | 109.6 | $d_{10}$ | 15.5 | | |
| $r_{11}$ | −382.9 | $d_{11}$ | 4.2 | $n_6/\nu_6$ | 1.80518/25.4 |
| $r_{12}$ | 122.3 | $d_{12}$ | 19.1 | $n_7/\nu_7$ | 1.80300/46.7 |
| $r_{13}$ | −103.9 | $d_{13}$ | 0.4 | | |
| $r_{14}$ | 888.1 | $d_{14}$ | 10.3 | $n_8/\nu_8$ | 1.80300/46.7 |
| $r_{15}$ | −249.0 | | | | | wherein $r_j$ is the radius of curvature of the $j$th lens face, $d_k$ is the distance between the $j$th lens face and the next successive lens face, $n_i$ is the refractive index and $\nu_i$ is the Abbe number of the $i$th lens.

2. A wide angle, high aperture ratio, long back focus lens system comprising eight successively designated lens elements in which the sixth and seventh lens elements are joined at their confronting faces to form a doublet, the lens system having the following dimensions and relationships, the lens faces being successively designated from the first to the fifteenth faces with the confronting faces of the sixth and seventh lenses defining a singly designated lens face:

| | | | | | |
|---|---|---|---|---|---|
| $r_1$ | 228.1 | $d_1$ | 6.9 | $n_1/\nu_1$ | 1.65160/58.6 |
| $r_2$ | 91.5 | $d_2$ | 34.7 | | |
| $r_3$ | 771.9 | $d_3$ | 9.6 | $n_2/\nu_2$ | 1.80740/35.4 |
| $r_4$ | −334.4 | $d_4$ | 0.4 | | |
| $r_5$ | 211.7 | $d_5$ | 14.0 | $n_3/\nu_3$ | 1.54771/62.9 |
| $r_6$ | 60.9 | $d_6$ | 37.6 | | |
| $r_7$ | 123.5 | $d_7$ | 54.8 | $n_4/\nu_4$ | 1.78800/47.5 |
| $r_8$ | −3915.5 | $d_8$ | 8.8 | | |
| $r_9$ | 252.6 | $d_9$ | 22.6 | $n_5/\nu_5$ | 1.80518/25.4 |
| $r_{10}$ | 113.9 | $d_{10}$ | 15.7 | | |
| $r_{11}$ | −357.9 | $d_{11}$ | 4.2 | $n_6/\nu_6$ | 1.80518/25.4 |
| $r_{12}$ | 145.6 | $d_{12}$ | 26.2 | $n_7/\nu_7$ | 1.74100/52.7 |
| $r_{13}$ | −101.2 | $d_{13}$ | 0.4 | | |
| $r_{14}$ | 543.8 | $d_{14}$ | 14.5 | $n_8/\nu_8$ | 1.81554/44.5 |
| $r_{15}$ | −288.3 | | | | | wherein $r_j$ is the radius of curvature of the $j$th lens face, $d_k$ is the distance between the $j$th lens face and the next successive lens face, $n_j$ is the refractive index and $\nu_i$ is the Abbe number of the $i$th lens.

3. A wide angle, high aperture ratio, long back focus lens system comprising eight successively designated lens elements in which the sixth and seventh lens elements are joined at their confronting faces to form a doublet, the lens system having the following dimensions and relationships, the lens faces being successively designated from the first to the fifteenth faces with the confronting faces of the sixth and seventh lenses defining a singly designated lens face:

| | | | | | |
|---|---|---|---|---|---|
| $r_1$ | 199.7 | $d_1$ | 6.8 | $n_1/\nu_1$ | 1.64000/60.2 |
| $r_2$ | 97.7 | $d_2$ | 31.9 | | |
| $r_3$ | 1186.8 | $d_3$ | 25.4 | $n_2/\nu_2$ | 1.80610/40.8 |
| $r_4$ | −355.7 | $d_4$ | 1.7 | | |
| $r_5$ | 266.1 | $d_5$ | 6.7 | $n_3/\nu_3$ | 1.62041/60.3 |
| $r_6$ | 62.3 | $d_6$ | 32.6 | | |
| $r_7$ | 127.7 | $d_7$ | 57.5 | $n_4/\nu_4$ | 1.81600/46.8 |
| $r_8$ | 1211.7 | $d_8$ | 7.9 | | |
| $r_9$ | 217.6 | $d_9$ | 43.2 | $n_5/\nu_5$ | 1.80518/25.4 |
| $r_{10}$ | 120.4 | $d_{10}$ | 11.7 | | |
| $r_{11}$ | −216.1 | $d_{11}$ | 3.9 | $n_6/\nu_6$ | 1.80518/25.4 |
| $r_{12}$ | 131.2 | $d_{12}$ | 18.8 | $n_7/\nu_7$ | 1.80300/46.7 |
| $r_{13}$ | −112.5 | $d_{13}$ | 0.7 | | |
| $r_{14}$ | 694.1 | $d_{14}$ | 14.3 | $n_8/\nu_8$ | 1.81600/46.8 |
| $r_{15}$ | −164.7 | | | | | wherein $r_j$ is the radius of curvature of the $j$th lens face, $d_k$ is the distance between the $j$th lens face and the next successive lens face, $n_i$ is the refractive index and $\nu_i$ is the Abbe number of the $i$th lens.

* * * * *